(12) United States Patent
Wang et al.

(10) Patent No.: US 6,630,200 B2
(45) Date of Patent: Oct. 7, 2003

(54) METHOD OF MAKING A CERAMIC WITH PREFERENTIAL OXYGEN REACTIVE LAYER

(75) Inventors: Hongyu Wang, Niskayuna, NY (US); Krishan Lal Luthra, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 86 days.

(21) Appl. No.: 09/846,548

(22) Filed: May 1, 2001

(65) Prior Publication Data

US 2002/0025454 A1 Feb. 28, 2002

Related U.S. Application Data

(62) Division of application No. 09/299,418, filed on Apr. 26, 1999, now Pat. No. 6,299,988.
(60) Provisional application No. 60/083,207, filed on Apr. 27, 1998.

(51) Int. Cl.$^7$ ................................................ C23C 14/16
(52) U.S. Cl. ............................ 427/255.26; 427/249.15; 427/255.7; 427/452
(58) Field of Search .................. 427/255.26, 249.15, 427/255.7, 452

(56) References Cited

U.S. PATENT DOCUMENTS

| | | | |
|---|---|---|---|
| 4,676,994 A | 6/1987 | Demaray | |
| 4,889,776 A | 12/1989 | Priceman | |
| 4,950,558 A | 8/1990 | Sarin | |
| 5,035,923 A | * 7/1991 | Sarin | 427/255 |
| 5,156,912 A | 10/1992 | Lukco et al. | |
| 5,391,404 A | 2/1995 | Lee et al. | |
| 5,441,762 A | 8/1995 | Gray et al. | |
| 5,496,644 A | 3/1996 | Lee et al. | |
| 5,545,337 A | 8/1996 | Hong | |
| 5,552,352 A | * 9/1996 | Brun et al. | 501/88 |
| 5,658,710 A | * 8/1997 | Neukermans | 430/320 |
| 5,705,231 A | 1/1998 | Nissley et al. | |
| 5,723,213 A | 3/1998 | Carpenter et al. | |
| 5,736,248 A | 4/1998 | Solntsev et al. | |
| 5,740,515 A | 4/1998 | Beele | |
| 5,741,596 A | 4/1998 | Skowronski et al. | |
| 5,744,777 A | 4/1998 | Bernecki et al. | |
| 5,763,008 A | 6/1998 | Sarin et al. | |
| 5,763,106 A | 6/1998 | Blanchard et al. | |
| 5,773,141 A | 6/1998 | Hasz et al. | |
| 5,847,283 A | * 12/1998 | Finot et al. | 73/812 |
| 5,985,470 A | * 11/1999 | Spitsberg et al. | 428/689 |
| 6,444,335 B1 | * 9/2002 | Wang et al. | 428/701 |

OTHER PUBLICATIONS

"Modification of Mullite–Based Coatings on Si–Based Ceramics for Enhanced Durability", by Kang N. Lee et al. HITEMP Review 1997, Advanced High Temperature Engine Materials Technology Program, vol. III: Turbine Materials—CMC's NASA Conference Publication 10192, Apr. 29–30, no page numbers.

* cited by examiner

*Primary Examiner*—Bret Chen
(74) *Attorney, Agent, or Firm*—Robert P. Santandrea; Patrick K. Patnode

(57) ABSTRACT

A method of forming an article. The method comprises forming a silicon-based substrate that is oxidizable by reaction with an oxidant to form at least one gaseous product and applying an intermediate layer/coating onto the substrate, wherein the intermediate layer/coating is oxidizable to a nongaseous product by reaction with the oxidant in preference to reaction of the silicon-containing substrate with the oxidant.

5 Claims, 2 Drawing Sheets

METHOD OF MAKING A CERAMIC WITH PREFERENTIAL OXYGEN REACTIVE LAYER

This application is a division of application Ser. No. 09/299,418 filed Apr. 26,1999 now U.S. Pat. No. 6,299,988, and 60/083,207 filed Apr. 27,1998 which is hereby incorporated by reference in its entirety.

This invention was made with government support under Contract No. NAS3-26385 awarded by NASA. The government may have certain rights in the invention.

BACKGROUND OF THE INVENTION

The invention relates to an article that includes a silicon-containing substrate and an intermediate layer/coating with an external barrier coating such as a protective environmental/thermal barrier coating (E/TBC).

Silicon-containing substrates have been proposed for structures used in high temperature applications, such as in heat exchangers and advanced internal combustion engines. Silicon-containing substrates are also used in gas turbine engines. Higher operating temperatures increase the efficiency of gas turbine engines. Silicon-based composite ceramics have been proposed as materials for applications in combustors for supersonic commercial airplanes. However, in many applications involving water-containing environments, a silicon-based substrate will recede and lose mass because of the formation of volatile species, such as silicon hydroxide [$Si(OH)_4$]. The recession rate due to the volatilization or corrosion is often unacceptably high so that an external barrier coating such as an environmental/thermal barrier coating (E/TBC) with high resistance to such environments is required.

The external barrier coating can be an environmental/thermal barrier coating (E/TBC) that comprises a chemically stabilized zirconia, such as yttria stabilized zirconia. These coatings are capable of preventing the substrate materials from being in direct contact with environmental oxygen that diffuses through the coatings fairly rapidly and reaches the underlying silicon-containing substrate. Oxidation of the silicon-containing substrate involves the formation of various gaseous products. For example, the following equations demonstrate the attack on silicon carbide (SiC) and silicon nitride ($Si_3N_4$):

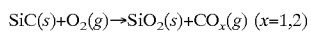
$SiC(s)+O_2(g) \rightarrow SiO_2(s)+CO_x(g)$ (x=1,2)

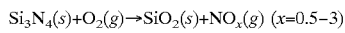
$Si_3N_4(s)+O_2(g) \rightarrow SiO_2(s)+NO_x(g)$ (x=0.5–3)

The form of the gaseous products is dependent on the oxygen partial pressure in the system. These gaseous species have low solubility and diffusivity in silica ($SiO_2$) and in other oxides, which causes them to be trapped at the external coating/substrate interface to form voids. The pressure of the gases in the voids can be sufficiently high at elevated temperatures to cause bursting. Voids can also interconnect to form large unbounded interfacial regions that result in coating spallation.

Thus, there is a need to prevent formation of gaseous oxidation products at an interface region between an environmental/thermal barrier coating (E/TBC) and a silicon-based substrate.

SUMMARY OF THE INVENTION

The present invention provides an article that prevents or substantially diminishes the formation of gaseous products at a coating-substrate interface. The invention is an article that comprises a silicon-containing substrate and at least one external environmental/thermal barrier coating. The external environmental/thermal barrier coating(s) is permeable to diffusion of environmental oxidant and the substrate is oxidizable by reaction with the oxidant to form at least one gaseous product. The article comprises an intermediate layer/coating between the silicon-containing substrate and the external environmental/thermal barrier coating(s) that is oxidizable to a nongaseous product by reaction with the oxidant in preference to reaction of the silicon-containing substrate with the oxidant.

In another aspect, the invention relates to a method of forming an article, comprising forming a silicon-containing substrate that is oxidizable by reaction with oxidant to form at least one gaseous product and applying an intermediate layer/coating onto the silicon-containing substrate, wherein the intermediate layer/coating is oxidizable to form a non-gaseous product by reaction with the oxidant in preference to reaction of the silicon-containing substrate with the oxidant.

DETAILED DESCRIPTION OF THE INVENTION

Figure 1:
FIG. 1 is a photomicrograph for an article without an intermediate layer/coating.

According to the invention, an article comprises a silicon-containing substrate and an intermediate layer/coating. The invention further comprises at least one external environmental/thermal barrier coating(s) applied to the intermediate layer/coating. The intermediate layer/coating prevents the formation of gaseous products that form voids at the external environment/thermal barrier coating-substrate interface. The voids can burst and can interconnect to form large unbounded interfacial regions. This can result in coating spallation and depreciated bonding between the silicon-containing substrate and the external environmental/thermal barrier coating(s).

According to the invention, an intermediate layer/coating is provided to reduce the gaseous products that would otherwise be emitted by reaction of the silicon-containing substrate with oxidants. The intermediate layer/coating preferentially reacts with oxidants to form non-gaseous products.

The intermediate layer/coating can comprise any suitable inorganic compound that will preferentially react with oxidants to form a non-gaseous product. Examples of intermediate layers/coatings include, elemental silicon (Si), silicon with one or more additional phases such as silicon carbide (SiC) or silicon nitride ($Si_3N_4$) or silicon carbide and silicon nitride to enhance thermal or mechanical properties, and silicon-alloys such as silicon aluminum (Si—Al), silicon chromium (Si—Cr), silicon magnesium (Si—Mg), silicon calcium (Si—Ca), silicon molybdenum (Si—Mo) and silicon titanium (Si—Ti). The silicon-alloy is chosen so that permeability of oxidants through the oxidation product of the alloy is low (compared to silica) in order to prevent rapid oxidation of the intermediate layer/coating. Preferably, the intermediate layer/coating comprises silicon.

The thickness of the silicon intermediate layer/coating can be estimated based on the data of B. E. Deal and A. S. Grove, "General Relationship for the Thermal Oxidation of Silicon," *J. Appl Phys.*, 36 [12] 3770–78 (1965) on the oxidation of silicon. The results are summarized in Table 1. The calculations were performed for silicon oxidation in dry oxygen ($O_2$) environment, assuming water ($H_2O$) in the combustion gas will not permeate through the oxide coating. The time for oxidation at high temperatures (1100–1400 C.) is 4,500 hours. Therefore, if a dense uniform layer/coating of silicon can be applied, a coating thickness of about 0.5 mil (12.7 $\mu$m) will suffice for a 4,500 hot hour application below about 1400° C. A thickness of about 1–2 mil, however, may be more practical.

TABLE 1

Thickness of Silicon Oxidized at Different Temperatures for 4,500 Hours

| Temperature (□C) | $O_2$ Diffusivity ($\mu m2/hr$) | Thickness of $SiO_2$ formed ($\mu m$) | Thickness of Si oxidized ($\mu m$) |
|---|---|---|---|
| 1100 | 0.027 | 11.0 | 4.8 (0.1 mil) |
| 1200 | 0.045 | 14.2 | 6.3 (0.2 mil) |
| 1300 | 0.075 | 18.4 | 8.1 (0.3 mil) |
| 1400 | 0.136 | 24.7 | 10.9 (0.4 mil) |

Suitable silicon-containing substrates include silicon carbide (SiC) and silicon nitride ($Si_3N_4$), as well as silicon alloys such as niobium silicon alloys, molybdenum silicon alloys and the like. The silicon-containing substrate can be a monolith or composite. A composite can comprise a reinforcing fiber, particulate or whisker and a silicon-based matrix. Exemplary fibers, particulate or whiskers are silicon carbide-containing, carbon-containing, silicon-containing, or mixtures thereof. The fibers, particulate or whiskers optionally can have at least one coating, such as a silicon nitride, silicon boride, or silicon carbide coating. The matrix can be processed by melt infiltration (MI), chemical vapor infiltration (CVI) or other technique. Exemplary silicon-containing substrates include a monolithic silicon carbide (SiC) and silicon nitride ($Si_3N_4$), a silicon carbide (SiC) fiber-reinforced silicon carbide (SiC) matrix composite, carbon fiber-reinforced silicon carbide (SiC) matrix composite, and a silicon carbide (SiC) fiber-reinforced silicon nitride ($Si_3N_4$) composite. The preferred substrate comprises a silicon carbide (SiC) fiber-reinforced silicon-silicon carbide (Si—SiC) matrix composite processed by silicon melt infiltration.

Exemplary of external environmental/thermal barrier coatings are chemically stabilized zirconias, alumina, and alumina silicate with or without bond coatings. Chemically stabilized zirconias include yttria stabilized zirconia, scandia stabilized zirconia, calcia stabilized zirconia, and magnesia stabilized zirconia. Exemplary bond coats are mullite, modified mullite, MCrAlY where M is nickel, iron, cobalt, nickel and cobalt, and mixtures thereof. Modified mullite comprises mullite and a modifier component. Modifier components for mullite include alkaline earth aluminosilicate, with the formula $MO.Al_2O_3.2SiO_2$, where M is an alkaline earth element. Preferred modifier components of the formula $MO.Al_2O_3.2SiO_2$ include barium feldspar ($BaO.Al_2O_3.2SiO_2$), strontium feldspar ($SrO.Al_2O_3.2SiO_2$), and combinations of barium feldspar ($BaO.Al_2O_3.2SiO_2$), and strontium feldspar ($SrO.Al_2O_3.2SiO_2$). Preferably, the alkaline earth aluminosilicate has a monoclinic celsian crystalline phase. Most preferred aluminosilicates include $(BaO)_{0.75}(SrO)_{0.25}.Al_2O_3.2SiO_2$ referred to as BSAS, $CaO.Al_2O_3.2SiO_2$ referred to as CAS and $BaO.Al_2O_3.2SiO_2$. Other suitable modifiers include materials referred to as NZP's such as $NaZr_2P_3O_{12}$, $Ba_{1.25}Zr_4P_{5.5}Si_{0.5}O_{24}$, $Ca_{0.5}Sr_{0.5}Zr_4(PO_4)_6$ and $Ca_{0.6}Mg_{0.4}Sr_4(PO_4)_6$. Other preferred modifier components include yttrium silicates, calcium aluminates including $3Ca_{0.5}.5\ Al_2O_3$, aluminum titanates including $Al_2O_3.TiO_3$, cordierite ($2MgO.Al_2O_3.5\ SiO_2$), fused silica ($SiO_2$) and silicon (Si). These materials are also chemically compatible with mullite.

The modifier components may be added to the modified mullite coating in a percent volume range between about 5 to about 50. Preferably, the modifier component is present in about 10 to about 30 volume percent of the modified mullite coating and most preferably in about 15 to 25 volume percent.

Preferably, the intermediate layer/coating comprises silicon and is applied between a silicon carbide (SiC) or silicon nitride ($Si_3N_4$) substrate and an external environmental/thermal barrier coating such as yttria-stabilized zirconia with a modified mullite bond coating.

The article of the invention may be used as a discrete composite article such as a gas turbine engine part.

When the intermediate layer/coating comprises silicon, the silicon preferentially reacts with oxygen to form a non-gaseous product to reduce the formation of voids that would otherwise deteriorate the bond between silicon-containing substrate and the environmental/thermal barrier coating(s). Additionally, the resulting silicon oxide ($SiO_2$) has a low oxygen permeability. Hence, the intermediate layer/coating acts as a protective barrier that deters permeation of oxygen into the substrate layer by at least two mechanisms. The source of gas generation is eliminated and voids are prevented that would otherwise accumulate at the interface between the external coating and silicon-containing substrate. Further, the product of the preferential reaction provides a barrier to permeation of unreacted oxygen into the silicon-containing substrate.

A silicon intermediate layer/coating can provide additional advantages. Silicon has a coefficient of thermal expansion (CTE) similar to that of silicon carbide (SiC) and mullite. Hence, an intermediate silicon layer/coating can minimize thermal stresses between the environmental/thermal barrier coating(s) and the silicon-containing substrate when used in combination with a silicon carbide (SiC) substrate and a mullite bond coating or external environmental/thermal barrier coating(s). A preferred article of the present invention comprises a silicon-containing substrate that is a melt infiltrated silicon-silicon carbide (Si/SiC) matrix reinforced with silicon carbide (SiC) fibers and an intermediate layer/coating that comprises silicon. An external environmental/thermal barrier coating(s) such as a bond coat (for example, mullite, MCrAlY where M can be nickel, iron, cobalt, and mixtures thereof) and a yttria stabilized zirconia is applied to the intermediate silicon layer/coating. The matrix of a melt infiltrated silicon-silicon carbide (Si/SiC) composite comprises about 10–20 volume percent (vol %) residual silicon. This residual substrate silicon reduces the coefficient of thermal expansion (CTE) mismatch between the silicon-containing substrate and the silicon intermediate layer/coating. In this embodiment, the silicon intermediate layer/coating can be applied as an extension of the infiltration process in which excess silicon infiltrate is used to build up a silicon or silicon-rich layer/coating on the silicon-containing substrate's surface. Also, the silicon intermediate layer/coating can be applied by simply dipping the silicon-containing substrates into a silicon melt. Both applications provide a dense and uniform silicon layer/coating on the silicon-containing substrate's surface. The external environmental/thermal barrier coating can then be applied directly onto the intermediate silicon layer/coating without any major treatment. Preoxidation of the silicon layer/coating to form a top silicon oxide ($SiO_2$) layer can improve bonding of oxide external barrier coatings. The intermediate layer/coating can also be applied by chemical vapor deposition (CVD), thermal spray, a solution based technique or other method.

When the external environmental/thermal barrier coating is an oxide that has a larger coefficient of thermal expansion (CTE) than the silicon-containing substrate, stresses can arise during temperature changes such as during start-up or shut down or as a result of "hot-spots" in the coating at high temperatures (above about 1000 C.). Thermal stresses are a main cause of coating failure and bond coat failure in these articles. The intermediate layer/coating of the invention is of particular advantage when used with these articles since it also serves as a stress-relieving compliant zone. Silicon deforms plastically at temperatures higher than about 600 C. (while maintaining a shear strength over 10 Mpa). This plasticity reduces thermal stresses exerting on the layer/coating, and hence improves layer/coating life span.

In another aspect of the invention, the capability of an intermediate layer/coating can be customized to withstand a higher temperature diffused through an external barrier coating by using a silicon-alloy layer/coating or by adding a refractory second phase into a silicon intermediate layer/coating. Silicon-based refractories, silicon carbide (SiC) and silicon nitride ($Si_3N_4$) can be used for this purpose so long as the proportion of silicon carbide (SiC) and silicon nitride ($Si_3N_4$) is limited so that the purpose of eliminating gas generation is not defeated. Generally, the volume percent of silicon carbide (SiC) and silicon nitride ($Si_3N_4$) should be limited to about 20 percent or less. Other non-gas generating refractory phases, such as silicon oxide (SiO2) and aluminum oxide ($Al_2O_3$), may also be used provided that they do not deteriorate the oxidation resistance of the intermediate layer/coating.

Fiber-reinforced silicon carbide (SiC) matrix compositions can have a CVD silicon carbide (SiC) overcoat to protect the fibers and matrices. In accordance with the present invention, some or all of the silicon carbide (SiC) can be replaced with the silicon or silicon-alloy intermediate layer/coating. Silicon has a coefficient of thermal expansion (CTE) lower than that of silicon carbide (SiC). Hence, the intermediate layer/coating of the invention can comprise a graded layer/coating with higher silicon carbide (SiC) concentration at an intermediate layer/coating-substrate interface than at the interface between the intermediate layer/coating-external environmental/thermal barrier coating interface. The silicon concentration is greater toward the external environmental/thermal barrier coating-intermediate layer/coating interface than at the interface between the intermediate layer/coating-substrate interface. The final strata of the intermediate layer/coating will consist essentially of silicon. Codeposition of silicon and silicon carbide is possible, e.g., by controlling the hydrogen/silicon (H/Si) ratio when silicon tetrachloride ($CH_3SiCl_3$) and hydrogen are used.

The following examples are for illustration of the invention only and do not limit the scope of the present invention.

EXAMPLE 1

In these examples, an intermediate layer/coating was applied to a silicon carbide (SiC) fiber-reinforced melt-infiltrated silicon-silicon carbide (Si—SiC)matrix. A 60 $\mu$m thick silicon intermediate layer/coating was deposited at 1100 C. with $SiCl_2H_2$ and hydrogen for about 50 minutes at about 0.9 Torr pressure. A plasma mullite bond coat about 1–2 mil thick, was deposited with a plasma yttria stabilized zirconia top coat that was about 1 mil thick. The coating was subjected to oxidation testing at 1300 C. for about 200 hours.

Figure 2:
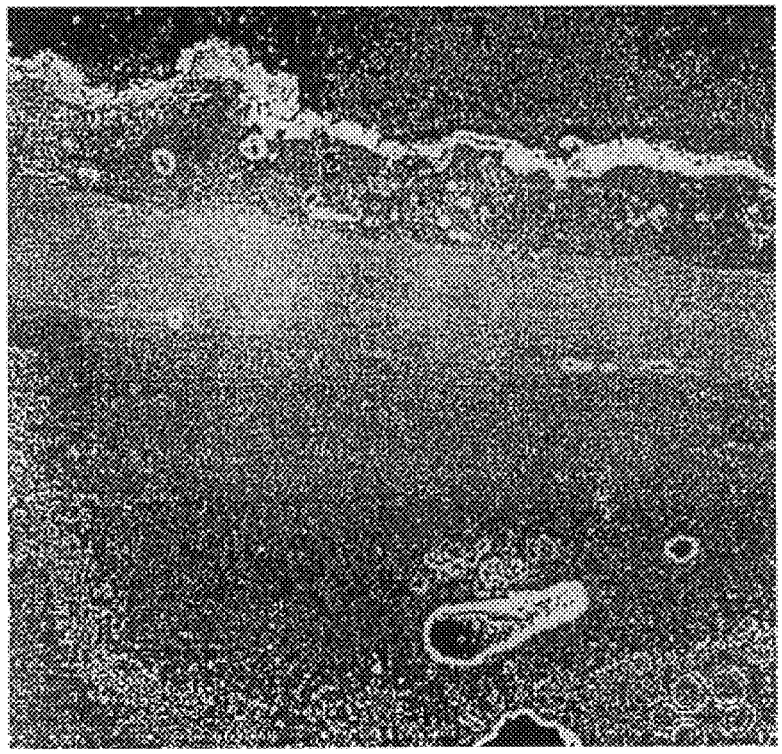
FIG. 2 is a photomicrograph for an article with an intermediate layer/coating.

The results of comparison between the coatings with the silicon intermediate layer/coating and without the silicon intermediate layer/coating are shown in the SEM micrographs, where FIG. 1 is without the silicon intermediate layer/coating and FIG. 2 is with the silicon intermediate layer/coating.

After oxidation at 1300 C. for 200 hours in air, the sample without the silicon intermediate layer/coating exhibited severe pore formation and debonding at the coating/substrate interface. The sample with the silicon intermediate layer/coating showed good bonding between the silicon intermediate layer/coating and silicon-containing substrate and between the silicon intermediate layer and external environmental/thermal barrier coating. No pore formation or debonding was seen at the coating-Si intermediate layer/coating interface.

EXAMPLE 2

Figure 3:
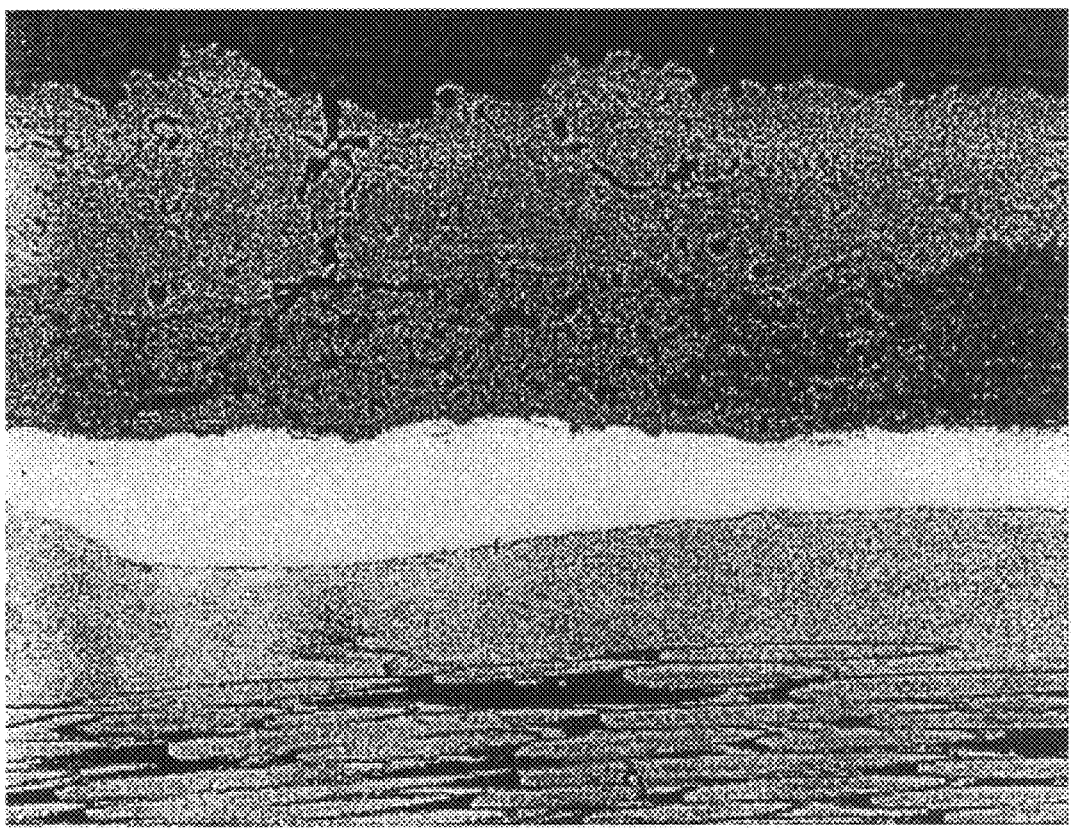
FIG. 3 is another photomicrograph for an article with an intermediate layer/coating formed by silicon melt infiltration.

In another example, a silicon intermediate layer/coating was applied by melt infiltration to the surface of a silicon carbide (SiC) fiber-reinforced melt infiltrated silicon-silicon carbide (Si—SiC) matrix composite. A yttria stabilized zirconia (YSZ)-mullite environmental/thermal barrier coating was applied to the intermediate silicon layer/coating. FIG. 3 shows good bonding between all layers.

The Examples show that an intermediate silicon layer/coating can improve bonding and avoid the formation of gaseous oxidation products at an interface region between an environmental/thermal barrier coating (E/TBC) and a silicon-containing substrate.

What is claimed:

1. A method of forming an article, the method comprising the steps of:

forming a silicon-containing substrate that is oxidizable by reaction with an oxidant to form at least one gaseous product; and applying an intermediate layer/coating onto said substrate, wherein said intermediate layer/coating is oxidizable to form a nongaseous product by reacting with said oxidant; and applying an external environmental/thermal barrier coating onto said outer surface of said intermediate layer/coating, wherein said external environmental/thermal barrier coating is permeable to diffusion of said oxidant, wherein said intermediate layer/coating is applied as a graded coating with higher silicon carbide (SiC) concentration at an intermediate layer/coating-substrate interface than at an intermediate layer/coating-external environmental/thermal barrier coating interface and increasing silicon concentration at an interface between the environmental/thermal hater coating and the intermediate layer/coating.

2. The method of claim 1, comprising applying said intermediate layer/coating by chemical deposition, melt infiltration, thermal spray, or solution-based techniques.

3. The method of claim 1, wherein said substrate is a silicon carbide (SiC) substrate, comprising applying a silicon intermediate layer/coating onto said substrate to reduce thermal stress between said substrate and said external environmental/thermal coating.

4. The method of claim 1, wherein said substrate has a lower coefficient of thermal expansion than the coefficient of thermal expansion of said external environmental/thermal baiter coating, comprising applying an intermediate layer/coating onto said substrate to reduce thermal stress between said substrate and said external environmental/thermal coating.

5. The method of claim 1, wherein said intermediate layer/coating comprises silicon.

* * * * *